(12) United States Patent
Boyette et al.

(10) Patent No.: US 10,609,523 B2
(45) Date of Patent: Mar. 31, 2020

(54) CONTEXT AND ENVIRONMENTALLY AWARE NOTIFICATIONS ON MOBILE DEVICES

(71) Applicant: CA, INC., New York, NY (US)

(72) Inventors: Neil Boyette, Oregon City, OR (US); Vikas Krishna, San Jose, CA (US)

(73) Assignee: CA, Inc., New York, NY (US)

(*) Notice: Subject to any disclaimer, the term of this patent is extended or adjusted under 35 U.S.C. 154(b) by 349 days.

(21) Appl. No.: 14/620,689

(22) Filed: Feb. 12, 2015

(65) Prior Publication Data
US 2016/0242142 A1  Aug. 18, 2016

(51) Int. Cl.
*H04W 68/00* (2009.01)
*H04W 4/12* (2009.01)

(52) U.S. Cl.
CPC ................................. *H04W 4/12* (2013.01)

(58) Field of Classification Search
CPC .................................................. H04W 68/005
See application file for complete search history.

(56) References Cited

U.S. PATENT DOCUMENTS

| | | | | |
|---|---|---|---|---|
| 8,924,493 | B1* | 12/2014 | Yeskel | G06F 9/542 709/206 |
| 9,179,256 | B1* | 11/2015 | Pietraniec | H04W 4/021 |
| 2005/0010928 | A1* | 1/2005 | Gunji | G06F 3/1203 719/318 |
| 2008/0039008 | A1* | 2/2008 | Chen | H04W 4/06 455/3.01 |
| 2010/0073160 | A1* | 3/2010 | Gilmour | G06F 3/04817 340/540 |
| 2011/0169632 | A1* | 7/2011 | Walker | H03G 3/32 340/539.13 |
| 2013/0346922 | A1* | 12/2013 | Shiplacoff | H04L 65/403 715/835 |
| 2014/0106720 | A1* | 4/2014 | Mairs | H04W 4/16 455/415 |
| 2014/0136615 | A1* | 5/2014 | Li | H04L 67/02 709/204 |
| 2014/0240216 | A1* | 8/2014 | Bukurak | H04M 1/7253 345/156 |
| 2014/0359042 | A1* | 12/2014 | Fenley | H04L 12/6418 709/208 |
| 2015/0120849 | A1* | 4/2015 | Thies | H04W 4/14 709/206 |
| 2015/0350885 | A1* | 12/2015 | Stanley-Marbell | H04W 8/22 455/418 |
| 2016/0066124 | A1* | 3/2016 | Chang | G06Q 30/0269 455/41.2 |

\* cited by examiner

*Primary Examiner* — Suhail Khan
(74) *Attorney, Agent, or Firm* — Kowert, Hood, Munyon, Ranking & Goetzel, P.C.

(57) ABSTRACT

A method includes performing operations as follows on a processor: receiving a notification associated with an application, the application being accessible via a mobile device, determining an importance of the notification based on a plurality of factors that provide context for a reason for the notification, comparing the importance of the notification with an importance threshold, performing one of queuing the notification without generating an alert on the mobile device and generating the alert on the mobile device based on the comparing of the importance of the notification with the importance threshold.

20 Claims, 5 Drawing Sheets

CONTEXT AND ENVIRONMENTALLY AWARE NOTIFICATIONS ON MOBILE DEVICES

BACKGROUND

The present disclosure relates to computing systems, and, in particular, to managing notifications on mobile devices.

Many mobile device applications desire the user's engagement and, thus, are frequently designed as if the user is always interacting with the application. This type of design philosophy has resulted in a large number of notifications, such as push/pop-up notifications, Short Message Service (SMS) notifications, and/or email notifications. Mobile operating system makers have given users a blunt tool to manage these notifications in the form of a binary on/off switch. As users started to turn off notifications, the application makers evolved and some started offering the user a choice in which notifications to receive. The choices, however, were often still blunt. Application makers typically only provided the choice for which types of notifications to receive. For example, in a Mobile Content Management (MCM) application, the user is given a choice whether they want to receive a notification when content is shared with them. While this is better than no control at all, it still may result in user dissatisfaction as for every piece of content shared with a user, the user will get a notification for which the user manually decides whether to engage the notification or ignore notification. As a significant amount of collaboration may occur in a large enterprise or organization, the number of notifications may be too much for many users, and in turn the users may simply disable the notification alerts at the operating system level. This lowers the value of providing MCM functionality, as users can no longer depend on a collaboration notification reaching the intended target. As a result, enterprises may prefer applications, which can better manage these notifications to increase the user's productivity while ensuring they are still aware of important content.

SUMMARY

In some embodiments of the inventive subject matter, a method comprises performing operations as follows on a processor: receiving a notification associated with an application, the application being accessible via a mobile device, determining an importance of the notification based on a plurality of factors that provide context for a reason for the notification, comparing the importance of the notification with an importance threshold, performing one of queuing the notification without generating an alert on the mobile device and generating the alert on the mobile device based on the comparing of the importance of the notification with the importance threshold.

In still other embodiments of the inventive subject matter, a system comprises a processor and a memory coupled to the processor, which comprises computer readable program code embodied in the memory that when executed by the processor causes the processor to perform operations comprising: receiving a notification associated with an application, the application being accessible via a mobile device, determining an importance of the notification based on a plurality of factors that provide context for a reason for the notification, comparing the importance of the notification with an importance threshold, performing one of queuing the notification without generating an alert on the mobile device and generating the alert on the mobile device based on the comparing of the importance of the notification with the importance threshold.

In still other embodiments of the inventive subject matter, a computer program product comprises a tangible computer readable storage medium comprising computer readable program code embodied in the medium that when executed by a processor causes the processor to perform operations comprising: receiving a notification associated with an application, the application being accessible via a mobile device, determining an importance of the notification based on a plurality of factors that provide context for a reason for the notification, comparing the importance of the notification with an importance threshold, performing one of queuing the notification without generating an alert on the mobile device and generating the alert on the mobile device based on the comparing of the importance of the notification with the importance threshold.

Other methods, systems, articles of manufacture, and/or computer program products according to embodiments of the inventive subject matter will be or become apparent to one with skill in the art upon review of the following drawings and detailed description. It is intended that all such additional systems, methods, articles of manufacture, and/or computer program products be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

Figure 1:
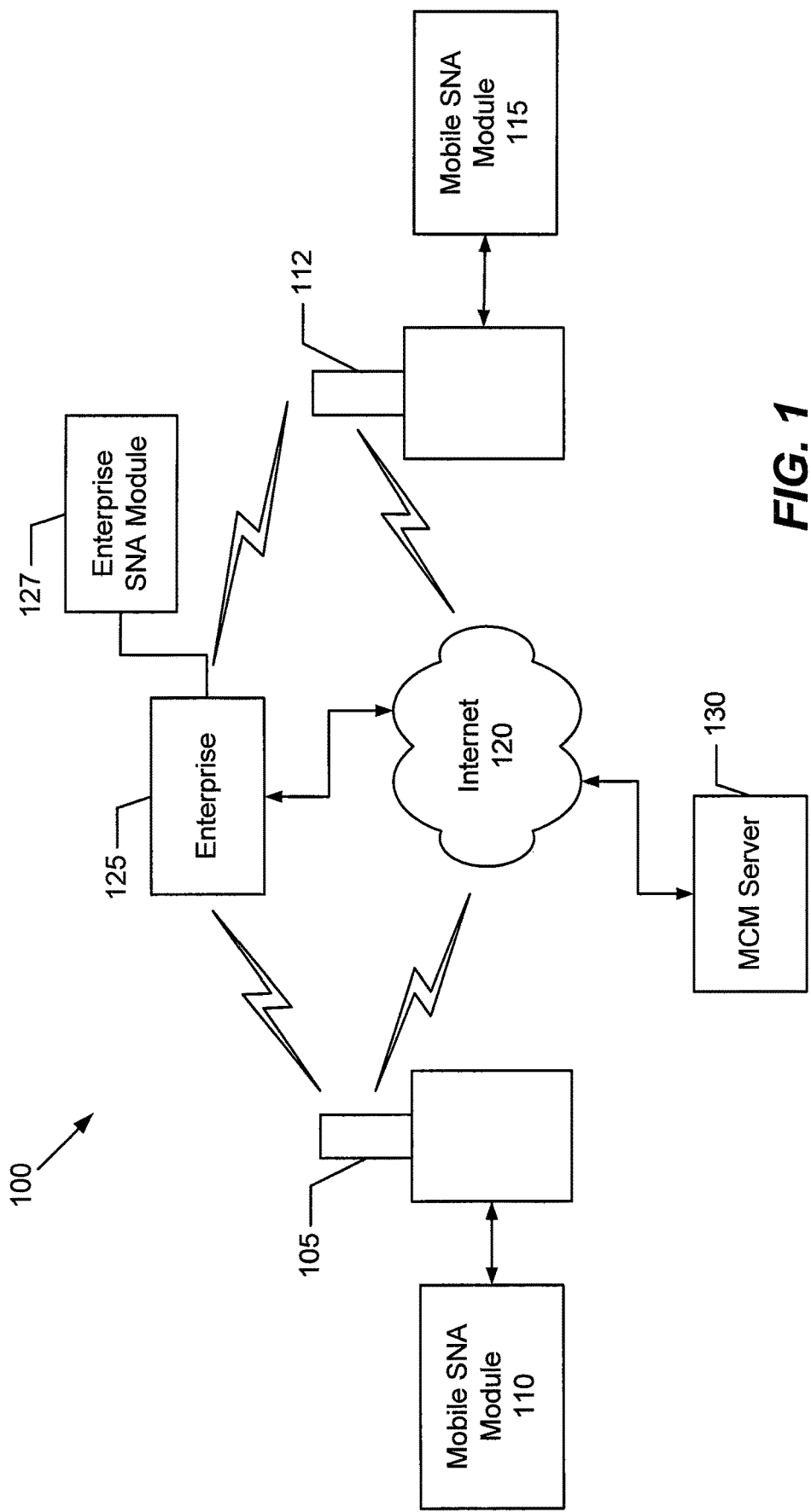
FIG. 1 is a block diagram of a system for facilitating context and environmentally aware notifications on mobile devices in accordance with some embodiments of the inventive subject matter.

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

As used herein, a "service" includes, but is not limited to, a software and/or hardware service, such as cloud services in which software, platforms, and infrastructure are provided remotely through, for example, the Internet. A service may be provided using Software as a Service (SaaS), Platform as a Service (PaaS), and/or Infrastructure as a Service (IaaS) delivery models. In the SaaS model, customers generally access software residing in the cloud using a thin client, such as a browser, for example. In the PaaS model, the customer typically creates and deploys the software in the cloud sometimes using tools, libraries, and routines provided through the cloud service provider. The cloud service provider may provide the network, servers, storage, and other tools used to host the customer's application(s). In the IaaS model, the cloud service provider provides physical and/or virtual machines along with hypervisor(s). The customer installs operating system images along with application software on the physical and/or virtual infrastructure provided by the cloud service provider.

As used herein, the term "data processing facility" includes, but it not limited to, a hardware element, firmware component, and/or software component. A data processing system may be configured with one or more data processing facilities.

As used herein, the term "mobile terminal" or "mobile device" may include a satellite or cellular radiotelephone with or without a multi-line display; a Personal Communications System (PCS) terminal that may combine a cellular radiotelephone with data processing, facsimile and data communications capabilities; a PDA or smart phone that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals or mobile devices may also be referred to as "pervasive computing" devices.

As used herein, data are raw, unorganized facts that need to be processed. Data can be something simple and seemingly random and useless until it is organized. When data are processed, organized, structured or presented in a given context so as to make it useful, it is called content or information. Examples of content or information include, but are not limited to, word processing files, slide presentation program files, spreadsheet files, video files, audio files, picture files, and document exchange files.

As used herein, an application is accessible via a mobile device if a user may interact with the application via the mobile device. The application may execute entirely on the mobile device, partly on the mobile device and another data processing system, or entirely on another data processing system. Interacting with the application may comprise sending data and/or information to the application and/or receiving data and/or information from the application.

Some embodiments of the inventive subject matter stem from a realization that a smart notification aware (SNA) module may be associated with an application to provide smarter management of notifications associated with the application. When the application has an event that triggers a proposed user notification, the SNA module determines the importance of the notification. Based on the level of importance of the notification, the SNA module may deliver the notification to the user through an appropriate alert or may queue the notification without generating an alert for the user to review at a later time. The importance of the notification may be determined based on contextual/environmental factors that provide context for a reason for the notification including, but not limited to, the subject matter of the notification, a time sensitivity associated with the notification, a business sensitivity associated with the notification, a relationship between the user (notification recipient) and the entity who is the source of the notification, and the manner in which the user has handled similar notifications in the past. When the importance level of the notification exceeds a determined importance threshold, for example, an alert is generated to announce the notification to the user. The alert can be generated in a variety of ways, which may be based on the relative importance of the notification, temporal information, such as the day or week and/or time of day, and/or whether the application is currently being accessed via the mobile device.

FIG. 1 is a block diagram of a system for facilitating context and environmentally aware notifications on mobile devices in accordance with some embodiments of the inventive subject matter. Employees of an enterprise, for example, may use mobile devices, such as smart phones, tablets, laptops, and the like to access various types of content belonging to the enterprise to do their work. As shown in FIG. 1, a first user of a mobile device 105 may communicate with various servers of an enterprise 125 to access content thereon. Likewise, a second user of a mobile device 112 may communicate with the various servers of the enterprise 125 to access content thereon. The enterprise 125 may have numerous servers that are responsible for the various operations of the enterprise and for storing the enterprise content. The particular functional responsibilities and the storage of content can be combined or divided in a variety of ways. Moreover, the enterprise servers may be implemented as separate servers on individual hardware platforms or as virtual servers on a common hardware platform. In addition, the functionality of various servers may be combined in a single server or separated into additional servers in accordance with various embodiments of the inventive subject matter. Although only two mobile devices 105 and 112 are illustrated, it will be understood that an enterprise may have numerous employees using mobile devices to access applications.

In working with applications residing on the mobile devices 105, 112 and/or the enterprise 125, various notifications associated with the applications may be triggered for the users on the mobile devices 105, 112. These notifications may be sent for a variety of reasons, such as meeting notices, event reminders, announcements that a document has been updated or checked out, and the like. The Mobile Content Management (MCM) server 130 may download Mobile Smart Notification Aware (SNA) modules 110, 115 to mobile devices 105, 112, respectively, and may download an enterprise SNA module 127 to the enterprise 125 server(s). The mobile SNA modules 110, 115 and enterprise SNA module 127 may be used to manage notifications on the mobile devices, such that multiple contextual/environmental factors may be applied to determine an importance of a notification. These factors may provide context for a reason for the notification and may include, but are not limited to, the subject matter of the notification, a time sensitivity associated with the notification, a business sensitivity associated with the notification, a relationship between the user (notification recipient) and the entity who is the source of the notification, and the manner in which the user has handled similar notifications in the past. The importance of the notification may be compared with an importance threshold, which is used to determine which notifications rise to a sufficient level of importance to generate an alert announcing the presence of the notification for the mobile device user and which notifications are not sufficiently important and can be placed in a queue for the user to review at a convenient time. The alert can be generated in multiple ways in accordance with various embodiments of the inventive subject matter and may be based on, for example, the relative importance of the notification, temporal information, such as the day or week and/or time of day, and/or whether the application is currently being accessed via the mobile device.

As shown in FIG. 1, the connections between the enterprise 125, MCM server 130, and the mobile devices 105, 112 may include wireless and/or wireline connections and may be direct or include one or more intervening local area networks, wide area networks, and/or the Internet. The network 120 may be a global network, such as the Internet or other publicly accessible network. Various elements of the network 120 may be interconnected by a wide area network, a local area network, an Intranet, and/or other private network, which may not be accessible by the general public. Thus, the communication network 120 may represent a combination of public and private networks or a virtual private network (VPN). The network 120 may be a wireless network, a wireline network, or may be a combination of both wireless and wireline networks.

Although FIG. 1 illustrates a system for facilitating context and environmentally aware notifications on mobile devices according to some embodiments of the inventive subject matter, it will be understood that embodiments of the present invention are not limited to such configurations, but are intended to encompass any configuration capable of carrying out the operations described herein.

Figure 2:
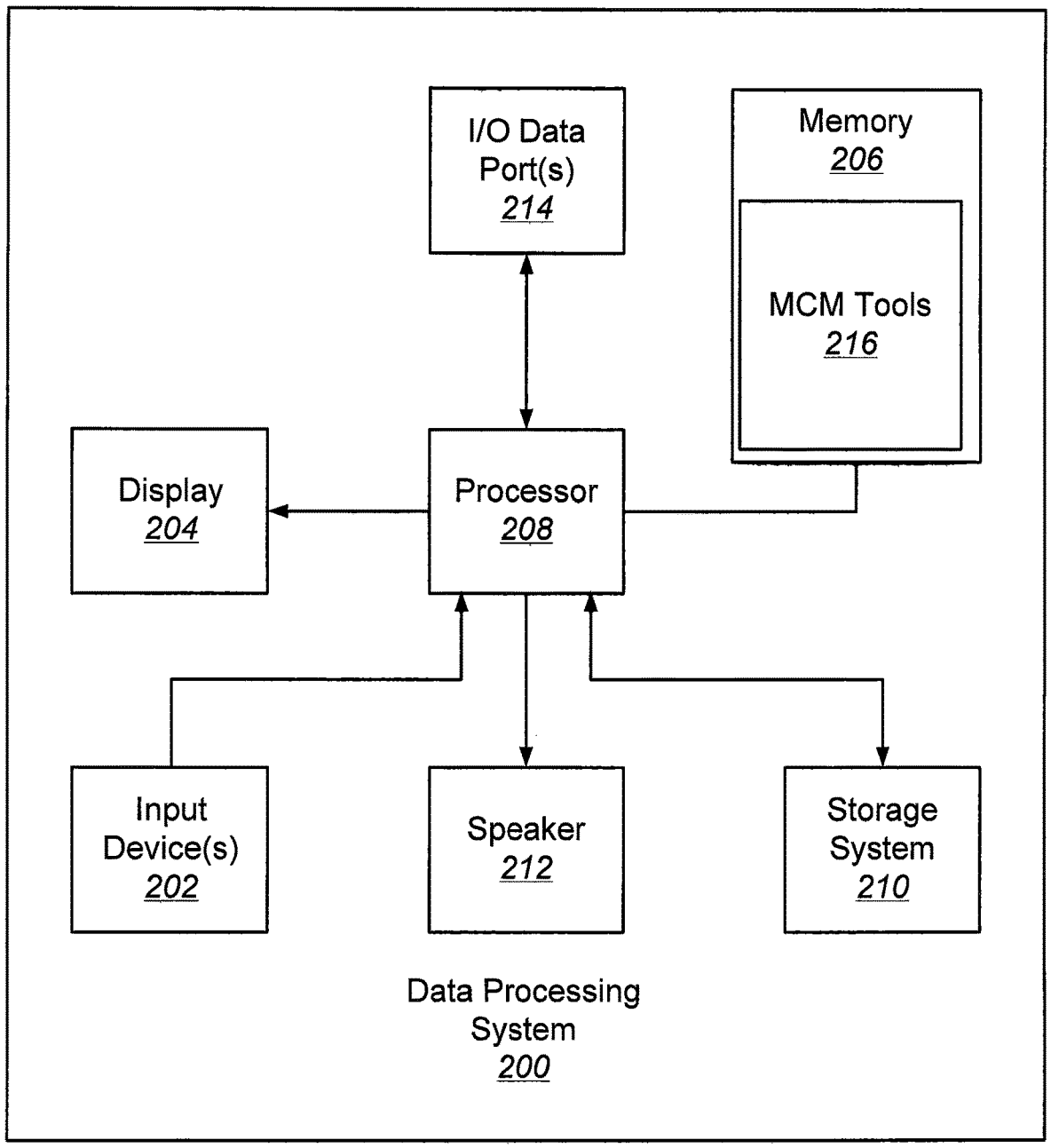
FIG. 2 illustrates a data processing system that may be used to implement the Mobile Content Management (MCM) server of FIG. 1 in accordance with some embodiments of the inventive subject matter.

Referring now to FIG. 2, a data processing system 200 that may be used to implement the MCM server 130 of FIG. 1, in accordance with some embodiments of the inventive subject matter comprises input device(s) 202, such as a keyboard or keypad, a display 204, and a memory 206 that communicate with a processor 208. The data processing system 200 may further include a storage system 210, a speaker 212, and an input/output (I/O) data port(s) 214 that also communicate with the processor 208. The storage system 210 may include removable and/or fixed media, such as floppy disks, ZIP drives, flash drives, USB drives, hard disks, or the like, as well as virtual storage, such as a RAMDISK or cloud storage. The I/O data port(s) 214 may be used to transfer information between the data processing system 200 and another computer system or a network (e.g., the Internet). These components may be conventional components, such as those used in many conventional computing devices, and their functionality, with respect to conventional operations, is generally known to those skilled in the art. The memory 206 may be configured with a MCM tools module 216 that may be configured to provide the mobile SNA modules 110, 115 and the enterprise SNA module 127 of FIG. 1 according to some embodiments of the inventive subject matter.

Figure 3:
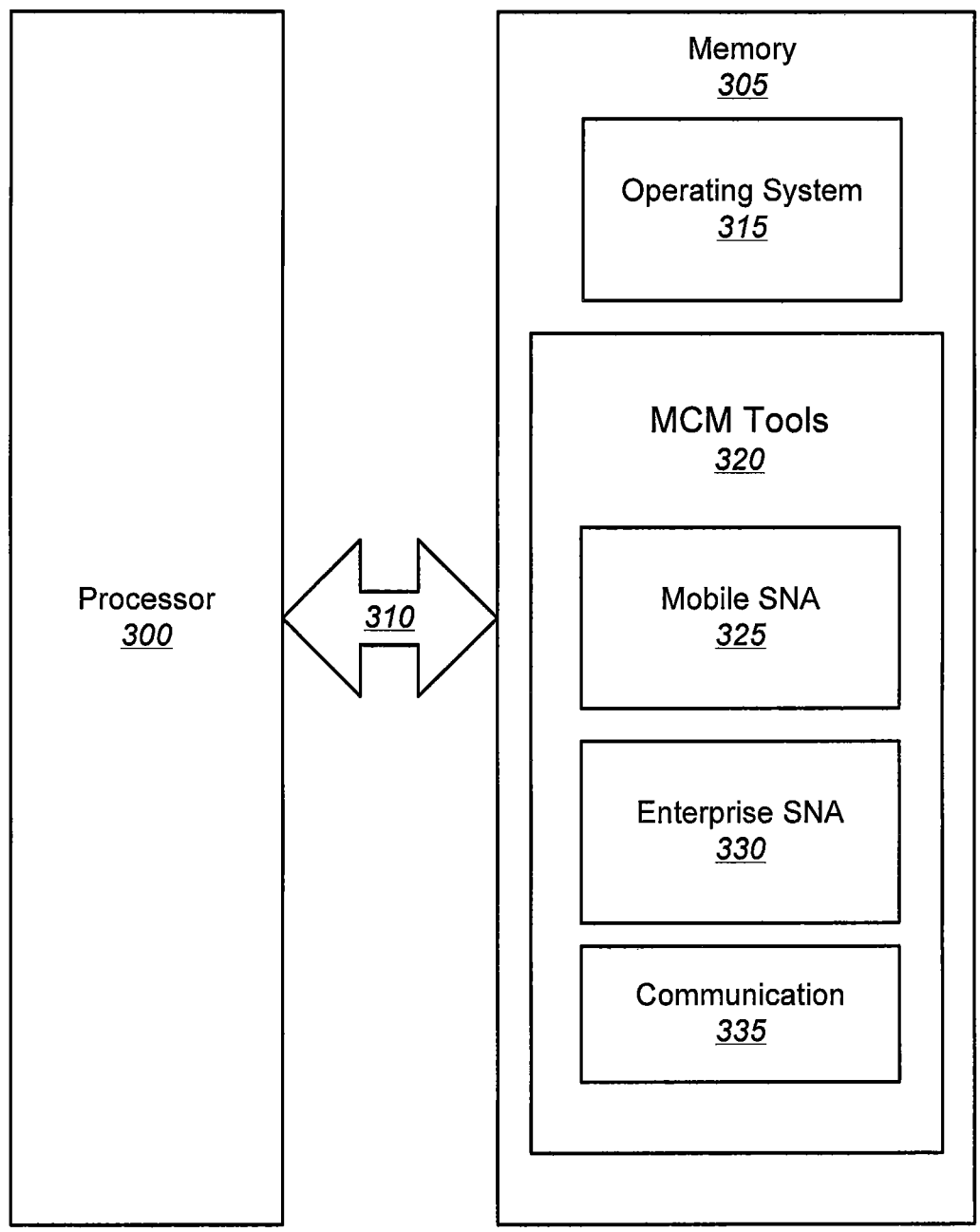
FIG. 3 is a block diagram that illustrates a software/hardware architecture for the MCM server of FIG. 1 in accordance with some embodiments of the present inventive subject matter.

FIG. 3 illustrates a processor 300 and memory 305 that may be used in embodiments of data processing systems, such as the MCM server 130 of FIG. 1 and the data processing system 200 of FIG. 2, respectively, for facilitating context and environmentally aware notifications on mobile devices according to some embodiments of the inventive subject matter. The processor 300 communicates with the memory 305 via an address/data bus 310. The processor 300 may be, for example, a commercially available or custom microprocessor. The memory 305 is representative of the one or more memory devices containing the software and data used for facilitating context and environmentally aware notifications on mobile devices in accordance with some embodiments of the inventive subject matter. The memory 305 may include, but is not limited to, the following types of devices: cache, ROM, PROM, EPROM, EEPROM, flash, SRAM, and DRAM.

As shown in FIG. 3, the memory 305 may contain up to two or more categories of software and/or data: an operating system 315 and a MCM tools module 320. In particular, the operating system 315 may manage the data processing system's software and/or hardware resources and may coordinate execution of programs by the processor 300. The MCM tools module 320 may comprise a mobile SNA module 325, an enterprise SNA module 330, and a communication module 335. The mobile SNA module 325 corresponds to the mobile SNA modules 110 and 115 of FIG. 1 and the enterprise SNA module 330 corresponds to the enterprise SNA module 127 of FIG. 1. As described above, the mobile SNA module 325 and enterprise SNA module 330 may be used to manage notifications on the mobile devices, such that multiple contextual/environmental factors may be applied to determine an importance of a notification. The importance of the notification may be compared with an importance threshold, which is used to determine which notifications rise to a sufficient level of importance to generate an alert announcing the presence of the notification for the mobile device user and which notifications are not sufficiently important and can be placed in a queue for the user to review at a convenient time. The functionality may be distributed between the mobile SNA module 325 and enterprise SNA module 330 in various ways to efficiently process the notifications. For example, some of the contextual/environmental factors used in evaluating the importance of a notification it may be more convenient to obtain the information from the enterprise server(s) 125 while for other factors the information may be more readily accessible at the mobile device 105, 112.

The communication module 335 may be configured to facilitate communication between the MCM server 130 and other entities, such as the mobile devices 105, 112 and the enterprise 125.

Although FIG. 3 illustrates hardware/software architectures that may be used in data processing systems, such as the MCM server 130 of FIG. 1 and the data processing system 200 of FIG. 2, respectively, for facilitating context and environmentally aware notifications according to some embodiments of the inventive subject matter, it will be understood that the present invention is not limited to such a configuration but is intended to encompass any configuration capable of carrying out operations described herein.

Figure 4:
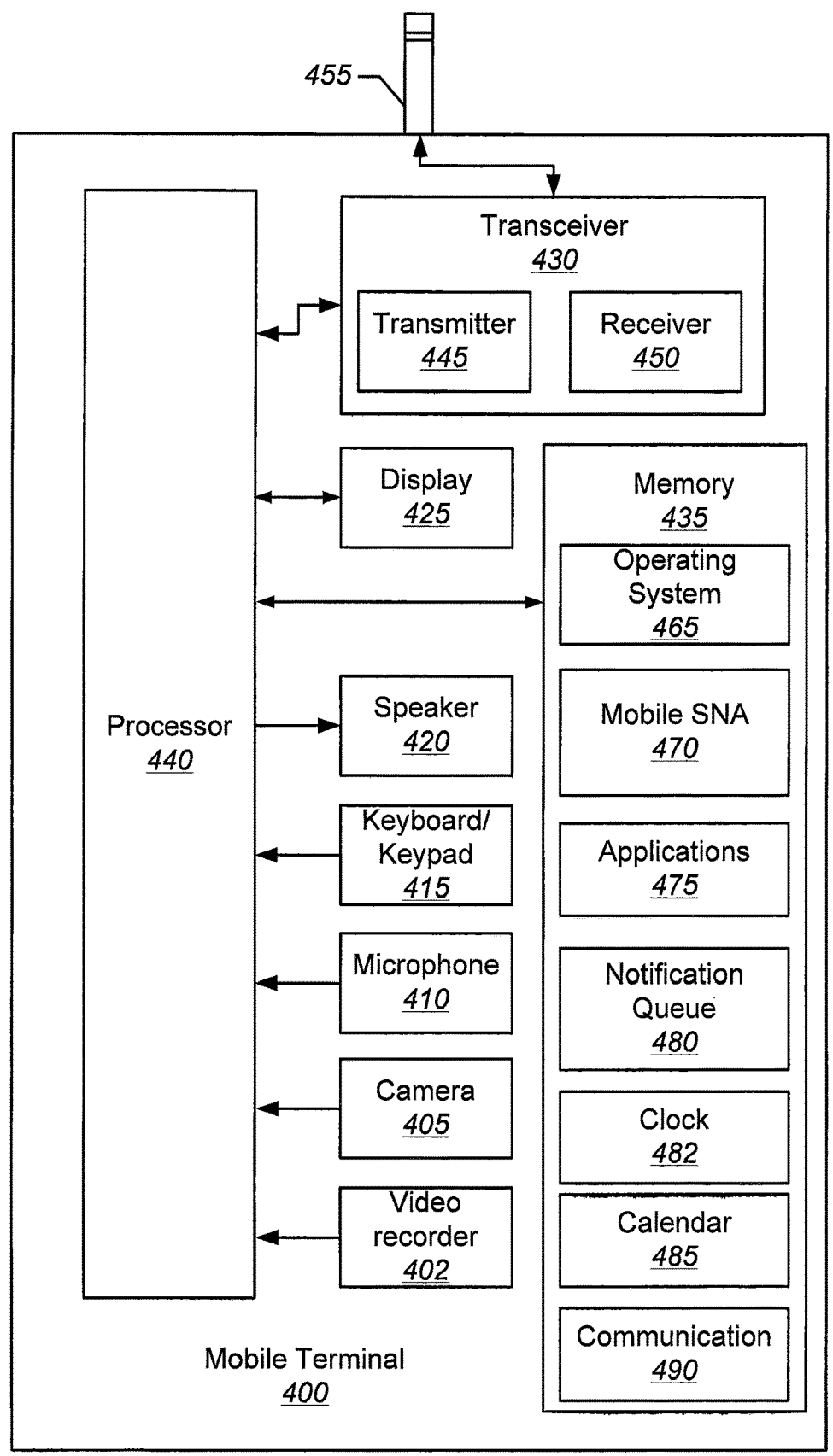
FIG. 4 is a block diagram that illustrates an electronic device/mobile terminal in accordance with some embodiments of the present inventive subject matter.

Referring now to FIG. 4, an exemplary mobile terminal 400 that may be used to implement the mobile terminals 105, 112 of FIG. 1, in accordance with some embodiments of the inventive subject matter, includes a video recorder 402, a camera 405, a microphone 410, a keyboard/keypad 415, a speaker 420, a display 425, a transceiver 430, and a memory 435 that communicate with a processor 440. The transceiver 430 comprises a transmitter circuit 445 and a receiver circuit 450, which respectively transmit outgoing radio frequency signals to base station transceivers and receive incoming radio frequency signals from the base station transceivers via an antenna 455. The radio frequency signals transmitted between the mobile terminal 400 and the base station transceivers may comprise both traffic and control signals (e.g., paging signals/messages for incoming calls), which are used to establish and maintain communication with another party or destination. The radio frequency signals may also comprise packet data information, such as, for example, cellular digital packet data (CDPD) information. The foregoing components of the mobile terminal 400 may be included in many conventional mobile terminals and their functionality is generally known to those skilled in the art.

The processor 440 communicates with the memory 435 via an address/data bus. The processor 440 may be, for example, a commercially available or custom microprocessor. The memory 435 is representative of the one or more memory devices containing the software and data used to facilitating context and environmentally aware notifications in accordance with some embodiments of the present invention. The memory 435 may include, but is not limited to, the following types of devices: cache, ROM, PROM, EPROM, EEPROM, flash, SRAM, and DRAM.

As shown in FIG. 4, the memory 435 may contain up to seven or more categories of software and/or data: an operating system 465, a mobile SNA module 470, applications 475, a notification queue 480, a clock module 482, a calendar module 485, and a communication module 480. The operating system 465 generally controls the operation of the mobile terminal 400. In particular, the operating system 465 may manage the mobile terminal's software and/or hardware resources and may coordinate execution of programs by the processor 440. The mobile SNA module 470 corresponds to the mobile SNA modules 110, 115 of FIG. 1, which have been described above.

The applications module 475 represents applications that may have one or more notifications associated therewith. The mobile SNA module 470 cooperates with the applications to process these notifications by determining their importance based on multiple contextual/environmental factors. The importance of the notification may be compared with an importance threshold, which is used to determine which notifications rise to a sufficient level of importance to generate an alert announcing the presence of the notification for the mobile device user. The applications module 475 represents applications that run on the mobile terminal 400 as well as applications that run partially on the mobile terminal 400 and partially on another data processing system. The applications module 475 further represents an interface for interacting with applications that execute entirely on another data processing system.

The notification queue 480 may be configured as a repository for notifications that are determined to be not sufficiently important to justify an alert. The user of the mobile device may review notifications stored in the notification queue at a convenient time.

As described above, the mobile SNA module 470 may determine the importance of a notification based on multiple factors that may provide context for a reason for the notification and may include, but are not limited to, the subject matter of the notification, a time sensitivity associated with the notification, a business sensitivity associated with the notification, a relationship between the user (notification recipient) and the entity who is the source of the notification, and the manner in which the user has handled similar notifications in the past. The SNA module 470 may communicate with the clock module 482 to obtain time information including, but not limited to, year, month, day, AM, PM, hour, and minute for use in determining the importance of a notification. Similarly, the SNA module 470 may communicate with a calendar module 485 to obtain date information, contact information, event information, and the like. For example, the mobile SNA module 470 may derive relationship information between the user and the entity corresponding to a source of a notification based on information contained in the calendar module 485. For example, the calendar module 485 may contain contact or other information indicating the notification is being sent from a customer, manager, etc. of the user of the mobile device 400.

The communication module 480 may be configured to facilitate communication between the mobile terminal 105/400 and other entities, such as the enterprise 125 and MCM server 130.

Although FIG. 4 illustrates an exemplary software and hardware architecture that may be used for facilitating context and environmentally aware notifications according to some embodiments of the inventive subject matter, it will be understood that embodiments of the present invention are not limited to such a configuration, but are intended to encompass any configuration capable of carrying out the operations described herein.

Computer program code for carrying out operations of data processing systems discussed above with respect to FIGS. 1-4 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Moreover, the functionality of the MCM server 130, data processing system 200, hardware/software architecture of FIG. 3, enterprise 125 servers and mobile device 105, 112/400 of FIGS. 1 and 4 may each be implemented as a single processor system, a multi-processor system, a multi-core processor system, or even a network of stand-alone computer systems, in accordance with various embodiments of the inventive subject matter. Each of these processor/computer systems may be referred to as a "processor" or "data processing system."

Figure 5:
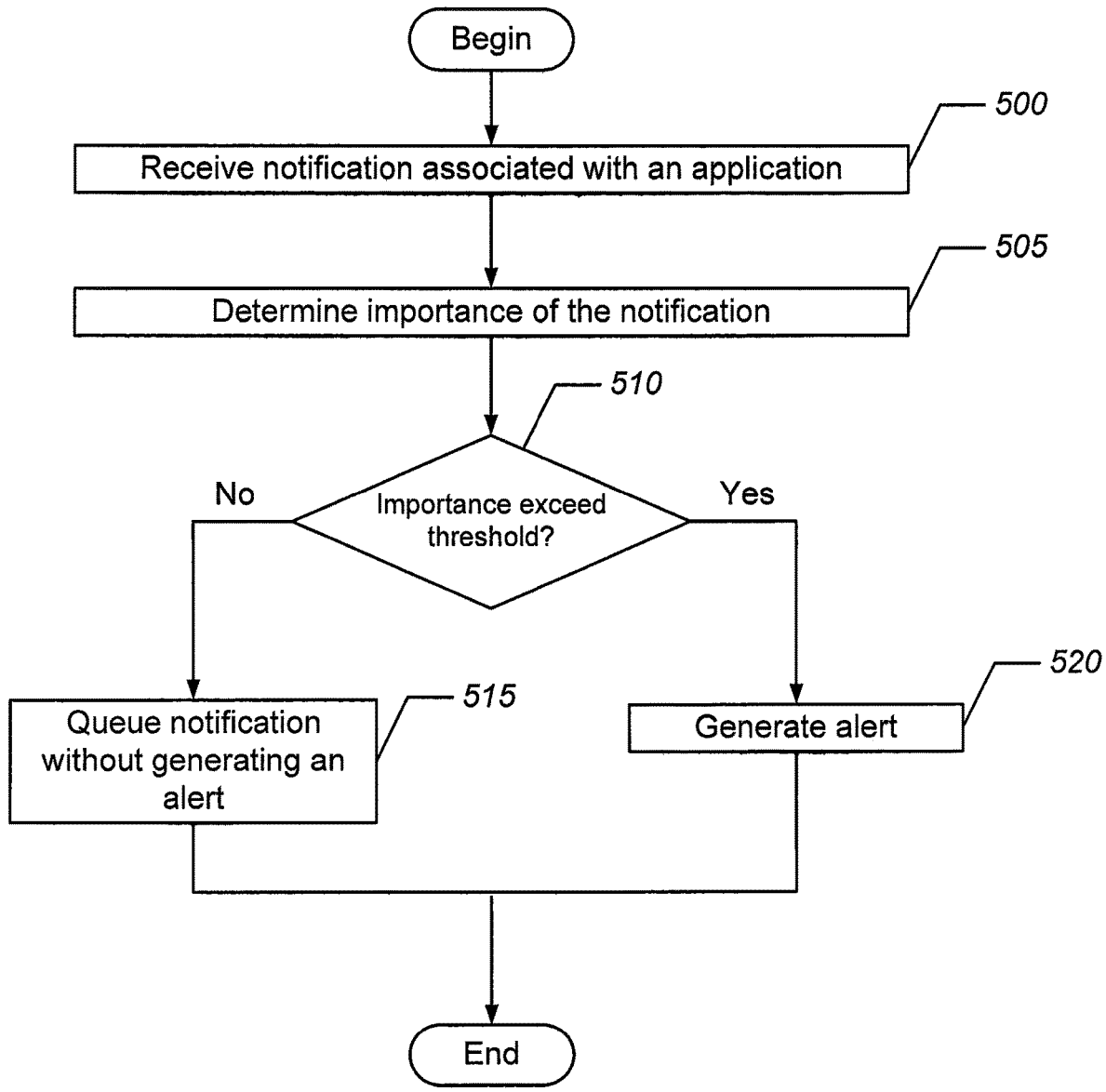
FIG. 5 is a flowchart that illustrates operations for facilitating context and environmentally aware notifications on mobile devices in accordance with some embodiments of the inventive subject matter.

FIG. 5 is a flowchart that illustrates operations for facilitating context and environmentally aware notifications in accordance with some embodiments of the inventive subject matter. Referring to FIG. 5, operations begin at block 500 where the mobile SNA module 110, 115 receives a notification associated with an application. The mobile SNA module 110, 115 then determines an importance of the notification at block 505. In accordance with various embodiments of the inventive subject matter, the importance is determined based on multiple contextual/environmental factors. These factors may provide context for a reason for the notification and may include, but are not limited to, the subject matter of the notification, a time sensitivity associated with the notification, a business sensitivity associated with the notification, a relationship between the user (notification recipient) and the entity who is the source of the notification, and the manner in which the user has handled similar notifications in the past.

The importance of the notification may be compared with an importance threshold, which is used to determine which notifications rise to a sufficient level of importance to generate an alert announcing the presence of the notification for the mobile device user and which notifications are not sufficiently important and can be placed in a queue for the user to review at a convenient time. In accordance with various embodiments of the inventive subject matter, a numerical score may be assigned to a notification indicating the relative importance of the notification relative to other notifications. The numerical score for the notification can be compared to a numerical importance threshold, which can be determined by the user or system administrator, for example, and a determination made whether to generate an alert for the notification or to queue the notification without generating an alert. In other embodiments, the importance assigned to a notification may not be a numerical score, but may be a qualitative characterization, such as very high, high, medium, low, and very low that can be used to provide levels of importance for the notifications. In this example, the importance threshold may be high, such that alerts are generated only for notifications characterized as high and very high, while notifications classified as medium, low, and very low are placed in a queue.

Returning to the example of FIG. 5, an importance threshold may be defined where a determination is made at block 510 whether the importance determined for the notification exceeds the importance threshold. If the determined importance for the notification exceeds the importance threshold, then an alert is generated for the user at block 520. In accordance with various embodiments of the inventive subject matter, the alert can be generated in different ways, which may be based on the relative importance of the notification, temporal information, such as the day or week and/or time of day, and/or whether the application is currently being accessed via the mobile device. For example, a notification of extremely high importance may justify an audible alert that does not cease until the user turns off the alert. Other notifications may only merit a pop-up window that disappears after a defined period of time. Thus, various types of sensory alerts can be used including audio, visual, and touch (e.g., the mobile device may vibrate). If the user is currently accessing the application via the mobile device, an in-application pop-up message may be used instead of a background notification, for example.

If the importance of the notification does not exceed the importance threshold as determined at block 510, then the notification is placed in a queue without generating an alert for the user to review at a convenient time.

Embodiments of the present inventive subject matter may provide a SNA component that can be associated with applications accessed through mobile devices to provide improved management of notifications. Whenever the application has an event that triggers a proposed user notification, the SNA component first determines the importance of the notification based on multiple contextual/environmental factors, then, based on its environment decide whether to generate an alert for the notification, and, if so, by which means. Determining the importance of a proposed notification depends on the type of notification and understanding the notification's context. Factors that may be considered include, for example, what was the action that triggered the proposed notification? Who triggered it? What is the importance of the object the action was performed on? What has the user done in response to notifications on similar content? The SNA component can understand its environment in a number of ways, including knowing whether the user is currently accessing the application via the mobile device, what the time of day is, the user's geographic location etc. Based on this knowledge, the SNA component can determine whether to show the notification via an alert, and, if so, the level of urgency required and the kind of alert to use.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

That which is claimed:

1. A method comprising:
   receiving, at a notification server system, a particular notification for a recipient, wherein the particular notification is generated by an application that is running on an application server system and is accessible by the recipient via a client computer system having operating-system-level restraints on receipt of notifications;
   determining, by the notification server system prior to the client computer system receiving and evaluating the particular notification, an importance of the particular notification to the recipient, wherein the determining is based on a plurality of factors that includes:
      an indication of a relationship between the recipient and a source of the particular notification;
      whether the application is currently being accessed by the recipient via the client computer system; and
      history information indicating the recipient's past acceptance of notifications;
   comparing, by the notification server system, the determined importance of the particular notification with an importance threshold;
   based on the comparing indicating that the importance threshold is not met:
      queuing, by the client computer system, the particular notification without generating an alert for the client computer system; and
      storing the particular notification in a repository that is subsequently available for review by the recipient via the client computer system.

2. The method of claim 1, wherein the plurality of factors includes subject matter of the particular notification.

3. The method of claim 1, wherein the plurality of factors includes a time sensitivity associated with the particular notification.

4. The method of claim 1, wherein the plurality of factors includes a business sensitivity associated with the particular notification.

5. The method of claim 1, wherein the indication of the relationship includes an indication that the source of the particular notification is a manager of the recipient, and wherein the indication is determined using contact information stored in the client computer system.

6. The method of claim 1, wherein evaluating, by the client computer system, the particular notification includes evaluating the particular notification according to the operating-system-level restraints.

7. The method of claim 1, wherein the plurality of factors includes history information indicating that the particular notification is related to past notifications based on a common entity as a source of the particular notification and the past notifications.

8. The method of claim 1, further comprising:
receiving and determining, by the notification server system, an importance of a different notification for the recipient, wherein the different notification is generated by the application;
comparing, by the notification server system, the determined importance of the different notification with the importance threshold; and
based on the comparing indicating that the importance threshold is met, generating, by the notification server system, an associated alert for the client computer system.

9. The method of claim 8, wherein determining the importance of the different notification includes determining the importance of the different notification based on subject matter of the different notification, a time sensitivity associated with the different notification, a business sensitivity associated with the different notification, a relationship between a source of the different notification and the recipient of the different notification;
wherein the different notification is a present notification and wherein determining the importance of the present notification comprises determining the importance of the present notification based on historical actions of the recipient of the different notification in processing past notifications that are related to the present notification; and
wherein generating the associated alert on the client computer system includes generating the associated alert based on a day of week and a time of day.

10. The method of claim 1, wherein the indication of the relationship between the source of the particular notification and the recipient includes an indication that the source of the particular notification is a manager of the recipient.

11. A system, comprising:
a processor of a notification server system; and
a memory coupled to the processor and comprising computer readable program code embodied in the memory that when executed by the processor causes the processor to perform operations comprising:
receiving a particular notification for a recipient, wherein the particular notification is generated by an application that is running on an application server system and is accessible by the recipient via a client computer system having operating-system-level restraints on receipt of notifications;
determining, prior to the client computer system receiving and evaluating the particular notification, an importance of the particular notification to the recipient, wherein the determining is based on a plurality of factors that includes:
an indication of a relationship between the recipient and a source of the particular notification;
whether the application is currently being accessed by the recipient via the client computer system; and
history information indicating the recipient's past acceptance of notifications;
comparing the determined importance of the particular notification with an importance threshold;
based on the comparing indicating that the importance threshold is not met:
queuing the particular notification without generating an alert for the client computer system; and
storing the particular notification in a repository that is subsequently available for review by the recipient via the client computer system.

12. The system of claim 11, wherein determining the importance of the particular notification comprises determining the importance of the particular notification based on subject matter of the particular notification.

13. The system of claim 11, wherein determining the importance of the particular notification comprises determining the importance of the particular notification based on a time sensitivity associated with the particular notification.

14. The system of claim 11, wherein determining the importance of the particular notification comprises determining the importance of the particular notification based on a business sensitivity associated with the particular notification.

15. The system of claim 11, wherein the indication of the relationship between the source of the particular notification and the recipient of the particular notification includes an indication that the source of the particular notification is a client of the recipient.

16. The system of claim 11, wherein determining the importance of the particular notification comprises determining the importance of the particular notification based on subject matter of the particular notification, a time sensitivity associated with the particular notification, and a business sensitivity associated with the particular notification;
and
further comprising generating, based on the comparing indicating that the importance threshold is met, an associated alert based on day of week, and time of day.

17. A computer program product, comprising:
a non-transitory computer readable storage medium comprising computer readable program code embodied in the medium that when executed by a processor causes the processor to perform operations comprising:
receiving a particular notification for a recipient, wherein the particular notification is generated by an application that is running on an application server system and is accessible via a client computer system;
determining, prior to the client computer system receiving and evaluating the particular notification, an importance of the particular notification to the recipient, wherein the determining is based on a plurality of factors that includes:
an indication of a relationship between the recipient and a source of the particular notification;
whether the application is currently being accessed by the recipient via the client computer system; and
history information indicating the recipient's past acceptance of notifications;
comparing the determined importance of the particular notification with an importance threshold;
based on the comparing indicating that the importance threshold is not met:
queuing the particular notification without generating an alert for the client computer system; and storing the particular notification in a repository that is subsequently available for review by the recipient via the client computer system.

18. The computer program product of claim 17, wherein determining the importance of the particular notification comprises determining the importance of the particular notification based on subject matter of the particular notification.

19. The computer program product of claim 17, wherein determining the importance of the particular notification comprises determining the importance of the particular notification based on a time sensitivity associated with the particular notification.

20. The computer program product of claim 17, further comprising:
   receiving a different notification for the recipient;
   determining the importance of the different notification based on subject matter of the different notification, a time sensitivity associated with the different notification, a business sensitivity associated with the different notification, a relationship between a first entity corresponding to a source of the different notification and a second entity corresponding to a recipient of the different notification;
   wherein the different notification is a present notification and wherein determining the importance of the present notification comprises determining the importance of the present notification based on historical actions of the second entity corresponding to the recipient of the different notification in processing past notifications that are related to the present notification; and
   generating an associated alert on the client computer system comprises generating the associated alert based on day of week, time of day, and on whether the application is currently being accessed via the client computer system.

* * * * *